United States Patent [19]
Olson

[11] Patent Number: 6,080,062
[45] Date of Patent: *Jun. 27, 2000

[54] LOTTO GAMING APPARATUS AND METHOD

[76] Inventor: Carl M. Olson, 2616 Sonoma St., Torrance, Calif. 90503

[ * ] Notice: This patent issued on a continued prosecution application filed under 37 CFR 1.53(d), and is subject to the twenty year patent term provisions of 35 U.S.C. 154(a)(2).

[21] Appl. No.: 08/673,817

[22] Filed: Jun. 27, 1996

[51] Int. Cl.[7] ............................... A63F 3/06; A63F 9/22
[52] U.S. Cl. ................................. 463/42; 463/17; 463/27
[58] Field of Search ............................ 273/269; 463/17, 463/18, 19, 26, 27, 28, 40, 41, 42; 364/412, 410

[56] References Cited

U.S. PATENT DOCUMENTS

| | | | |
|---|---|---|---|
| 4,312,511 | 1/1982 | Jullien | 273/237 |
| 4,378,940 | 4/1983 | Gluz et al. | 273/237 |
| 4,455,025 | 6/1984 | Itkis | 273/237 |
| 4,624,462 | 11/1986 | Itkis | 273/237 |
| 4,704,693 | 11/1987 | Reimer et al. | 364/513.5 |
| 4,747,600 | 5/1988 | Richardson | 273/237 |
| 4,842,278 | 6/1989 | Markowicz | 463/18 |
| 4,856,787 | 8/1989 | Itkis | 273/237 |
| 4,875,686 | 10/1989 | Timms | 273/237 |
| 5,007,649 | 4/1991 | Richardson | 273/269 |
| 5,042,818 | 8/1991 | Weingardt | 273/292 |
| 5,178,395 | 1/1993 | Lovell | 273/238 |
| 5,232,221 | 8/1993 | Sludikoff | 273/139 |
| 5,280,909 | 1/1994 | Tracy | 463/27 |
| 5,282,633 | 2/1994 | Boylan et al. | 273/306 |
| 5,332,219 | 7/1994 | Marnell, II. et al. | 364/412 |
| 5,364,069 | 11/1994 | Guttman et al. | 273/439 |
| 5,365,575 | 11/1994 | Katz | 379/92 |
| 5,380,007 | 1/1995 | Travis et al. | 273/269 |
| 5,393,057 | 2/1995 | Marnell, II | 273/269 |
| 5,403,999 | 4/1995 | Entenmann et al. | 235/379 |
| 5,417,424 | 5/1995 | Snowden et al. | 463/18 |

FOREIGN PATENT DOCUMENTS

| | | |
|---|---|---|
| 0310368 A2 | 4/1989 | European Pat. Off. . |
| 0450520 A2 | 10/1991 | European Pat. Off. . |
| 2231809 | 11/1990 | United Kingdom . |
| 2256594 | 12/1992 | United Kingdom . |

OTHER PUBLICATIONS

International Search Report Re PCT/US97/08457.
IGWB—"Gaming's Ball and Chain" vol. 17, No. 10—Oct. 1996.
IGWB—Europe "Room for New Ideas" Taxing the Capitalists—May 1996.
North American Gaming At a Glance—Sep. 1996.
Free Enterprise Spirit—Sep. 1996.
Video Lotto "Ther's A New Game In Town", Creative Gaming Concepts, St. Petersburg, Florida.
Oasis Electronic ITVM "The Future of the Scratch Ticket is Here".

*Primary Examiner*—Benjamin H. Layno
*Attorney, Agent, or Firm*—Fulwider Patton Lee & Utecht, LLP

[57] ABSTRACT

An individual electronic game for playing Lotto wherein acknowledgment as to the player's win or loss status is rapidly displayed. The player plays his/her selected numbers against the electronic lotto gaming apparatus randomly generated win numbers. In addition, the lotto gaming apparatus can transfer and receive lotto game information to a central processing system which is capable of handling multiple players from multiple lotto gaming apparatus either within a certain gaming facility or on a more universal, state wide, nationally or internationally. An additional embodiment of the invention allows individual players of the lotto games, with rapid determination of win status, via an electronic telecommunications network such as Internet.

14 Claims, 7 Drawing Sheets

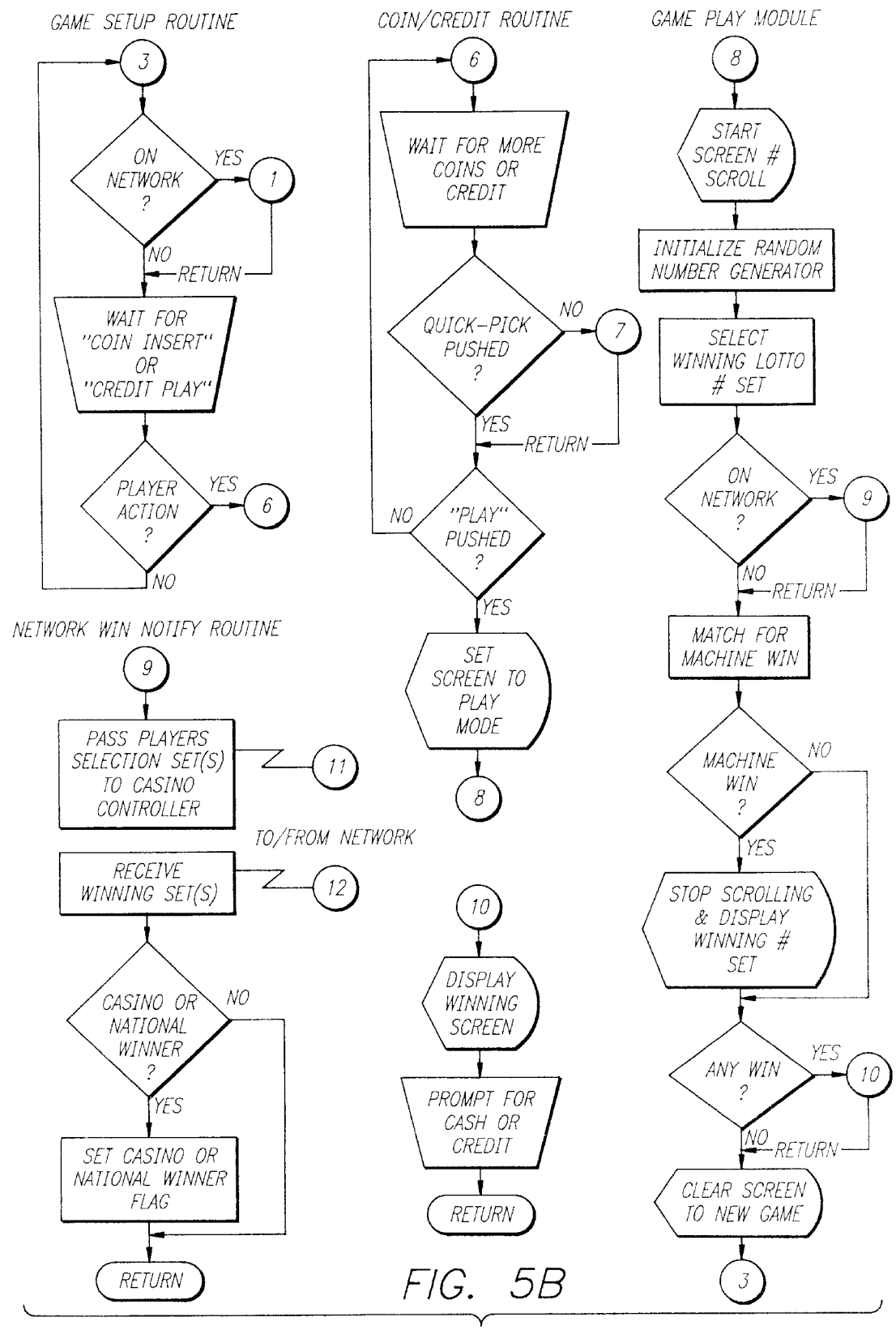

LOTTO GAMING APPARATUS AND METHOD

BACKGROUND OF THE INVENTION

1. Field of the Invention

This invention relates to an electronic Lotto game, and more particularly to a Lotto game which provides the player with rapid acknowledgment of the win or loss status of the numbers played.

2. Description of Related Art

Generally, lotto is played as a state-wide governmental system where the player chooses to play the game by wagering money, usually in one dollar ($1.00) increments, and obtaining some form of lotto ticket with the player's lotto numbers selection printed thereon. During designated times, the game is open to any new players and is then closed, at a regularly scheduled selected period. At the time of the closing of the lotto game, a series of random numbers are selected by the agency running the lotto game and winners are determined by the players matching their selected numbers with those randomly selected by the lotto agency. Winners are notified only if they observe the announcements of the winning numbers through the mass media, or if they check the winning numbers posted at a lotto ticket dispensing facility.

Attempts have been made to automate lotto games, but in every case the automation has generally been limited to the mechanics of selection of numbers and issuance of tickets to players of the lotto game, or the computer visualization of the traditional lotto mechanical number selection apparatus. What is needed is a system for a lotto game that provides the player with instant acknowledgment of the win or loss status of the numbers selected by the player against those randomly selected by the machine on which the game is being played, or by the agency administering the lotto game. This invention provides such a system for playing a lotto game.

SUMMARY OF THE INVENTION

This invention is directed to a lotto game wherein the player is provided with a rapid acknowledgment of the winning or losing status of the numbers selected by the player. Once a player selects a series of numbers and starts the game, the Lotto Gaming Apparatus of the invention nearly instantly determines whether any, or all, of those numbers match the set of numbers randomly selected by the apparatus as the winning numbers. If the player is a winner, the Lotto Gaming Apparatus pays or credits the winner without delay. In one presently preferred embodiment of the invention, the Lotto Gaming Apparatus can be played independent of a master controller, master number selection system, or any delays waiting for future winning number selection drawings.

In another presently preferred embodiment of the invention, each Lotto Gaming Apparatus is interconnected with other Lotto Gaming Apparatuses, and an appropriate master controller, so that each player simultaneously plays lotto against the Lotto Gaming Apparatus on which the game is being played and against the master controller. In this embodiment, the player selects a series of numbers on the Lotto Gaming Apparatus. The local Lotto Gaming Apparatus generates a randomly selected series of numbers which represent the winning set of numbers and instantly identifies which of the players numbers are a match. The player is thereafter notified of the winning, or losing, status of his/her selected numbers. The local Lotto Gaming Apparatus also sends the player's selected numbers to a master controller which has generated another randomly selected series of numbers. The player's selected numbers are compared with the master controller randomly selected numbers to determine the win, or lose, status of the player's selection of numbers. At the same time that the master controller is determining the status of player #1's selections, players #2 through #n are also being reviewed by the master controller for a win or loss status. This embodiment of the invention, by combining the selections and payoffs of more than one device, can provide larger payouts to the individual players. This embodiment of the invention further provides instant status of increasing, (progressive), payouts at the master controller concerning payouts to, and inputs from, the connected Lotto Gaming Apparatuses. This embodiment of the invention need not be limited to a selection of Lotto Gaming Apparatuses within a single casino, bar, store, or other gaming facility. It can be collective games played over a group of gaming facilities, over a state, national or international network.

Another embodiment of the invention provides a means of lotto game playing through a personal computer, or home video game terminal via a telecommunication network, (e.g.: the Internet).

In any of the embodiments in which multiple Lotto Gaming Apparatuses are connected to a master controller, one objective in the invention can be to provide a variable win/loss capability, such that the actual and relative amounts of wins versus losses can be adjusted. This adjustment can be accomplished, as an example, by changing the jackpot seed amount, (the minimum level of the progressive jackpot after payout of a win), or by adjusting the number of lotto numbers from which the player will select, (e.g.: 51, 60, 70, etc.). While a game involving a choice of six numbers is used for the purpose of illustration, it will be understood that the choice of number of picks from a given number of possibility (e.g. 6 from 49, etc.) may be used to provide appropriate odds for winning.

A typical game would find the player inserting the appropriate wager, (e.g.: $1.00) into the Lotto Gaming Apparatus and selecting up to six numbers, (or alternatively, a selection of a "quick-pick which commands the device to randomly select six numbers for the player). When satisfied with the numbers set selected, the player then would push the PLAY button on the Lotto Gaming Apparatus and the game is automatically played, comprising the following steps:

1. The Lotto Gaming Apparatus initiates an internal random number generator which selects the six winning numbers for that one play,
2. The six winning numbers are displayed on the screen on the face of the Lotto Gaming Apparatus,
3. The player is instantly notified, on the screen of the Lotto Gaming Apparatus, if any of the player selected numbers match the Lotto Gaming Apparatus selected winning numbers,
4. The player is paid any winnings according to a published schedule either displayed on the screen or attached to the Lotto Gaming Apparatus, (for example: two of six numbers may pay $5.00, three of six numbers $50.00, and six of six numbers $500.00) and,
5. The player is asked if another game is to be played, and if so to insert another wager, thus repeating the PLAY cycle.

In those embodiments of this invention where multiple Lotto Gaming Apparatus are interconnected through a Master Controller, with each PLAY, the player could have an opportunity to win at three independent levels with three distinct randomly selected winning number combinations played against a single six number combination selected by the player at the Lotto Gaming Apparatus he is currently playing. At the Lotto Gaming Apparatus where the player has selected six numbers, a random number generator has selected a six number winning lotto pick which is applicable only for that Lotto Gaming Apparatus. At the same time of that PLAY, the player's selected numbers are forwarded, via a secure electronics network to a Master Controller at a casino or other gambling facility level where a separate random number generator has already selected a six number winning combination for that PLAY. Simultaneously to these two PLAY events, the player's selected numbers may also be sent, via a secured electronics network, to a state or national level Master Controller where a distinct third set of six randomly generated winning numbers have been selected for that PLAY. The player therefore could be a winner at any one of the three levels, or any combination of the three; as an example: two out of six matching numbers at the national level, three out of six at the state level, with no matching numbers at the Lotto Gaming Apparatus. The screen on the Lotto Gaming Apparatus where the PLAY originated will display the results of all three "games" simultaneously. Since the probability of success of a six out of six pick typically reaches lotto proportions, the dollar amount for a "pick-six" can rapidly reach multi-millions in a relatively short period of time.

An important improvement of this Lotto Gaming Apparatus over prior art lotto games is the rapid acknowledgment of the win or loss status of the player's selected numbers and the ability of the player to then immediately play another game without delays of hours or days before another game will close and the winning numbers are selected.

Other features and advantages of the present invention will become more apparent from the following detailed description of the invention, which, when taken in conjunction with the accompanying drawings illustrate by way of example the benefits of the invention.

BRIEF DESCRIPTION OF THE DRAWINGS

FIGS. 5a and 5b are software flow diagrams depicting the steps that sequentially occur when a player initiates a lotto game on the Lotto Gaming Apparatus.

DETAILED DESCRIPTION OF THE PREFERRED EMBODIMENT

The present invention includes a method and apparatus for playing a lotto game with rapid acknowledgment of the players' win or loss status.

Figure 1:
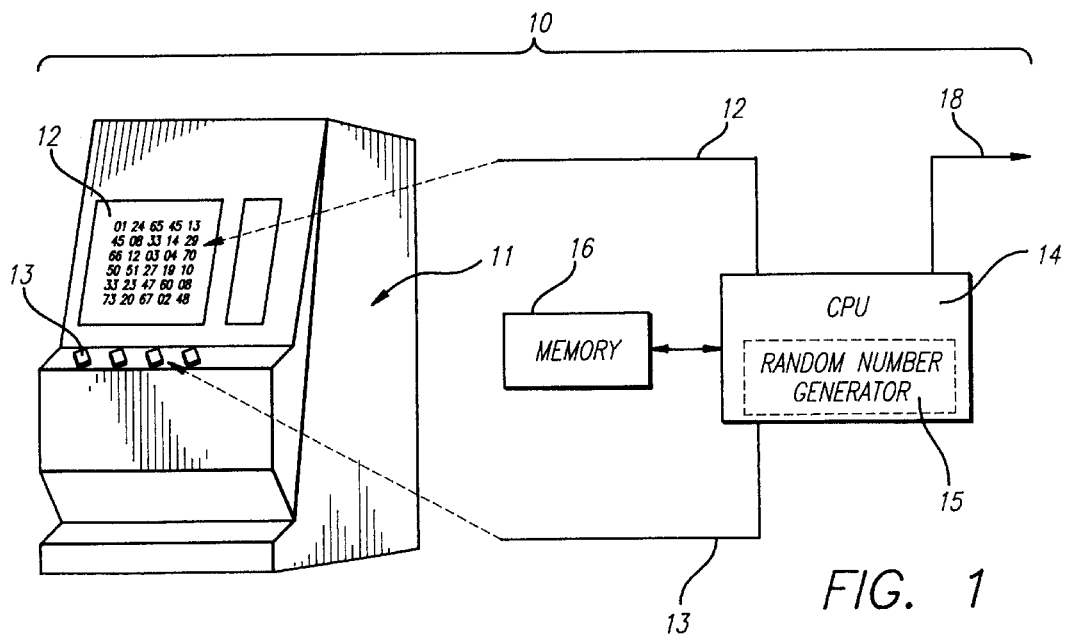
FIG. 1 is a functional diagram of the Lotto Gaming Apparatus of the invention which depicts interaction of the CPU with integral random number generator, keyboard, video display, and local area network.

The present invention can be embodied in several system configurations. One embodiment is depicted in FIG. 1, where a single Lotto Gaming Apparatus 10 allows one person to play a lotto game against a single gaming machine. This embodiment comprises a Casino Lotto Machine (CLM) 11 which consists of a video display 12, an input/out communications means which can be through keyboard, voice recognition, capacitive touch screen, or other means 13, a Central Processing Unit (CPU) 14 with internal random number generator 15 and memory 16, and a local network connection 18. In this embodiment, input/output capability can be provided by voice communications. In this configuration, a player may insert a bet, typically a dollar ($1.00), and then select up to six numbers, or command the CLM 11 to randomly select six numbers for him/her, which are then displayed on the video display terminal 12. Upon satisfaction with the selected numbers the player commands a start by pressing the keyboard 13 PLAY key. A lotto game is started by the CLM 11 which commands the random number generator 15 to select six numbers to be played against the players selected numbers. During this period, the display terminal 12 shows random numbers scrolling on the display screen to simulate a random number selection process, which in fact takes the CPU 14 random number generator 15 less than a millisecond to perform. After a programmed delay for simulated random number display, the CLM 11 randomly generated winning numbers [win numbers] are displayed on the video display terminal 12 and the player selected numbers are compared for any matches. All matching numbers are highlighted on the video display terminal 12 and, if a winning combination is detected,(e.g.; two matches, three matches, etc.), an instant payoff at the CLM 11 occurs. The CLM 11 then interrogates the player to determine if another lotto game will be played. If the player responds yes, another bet from the player is demanded on the video display 12 and the cycle described above repeats.

Figure 2:
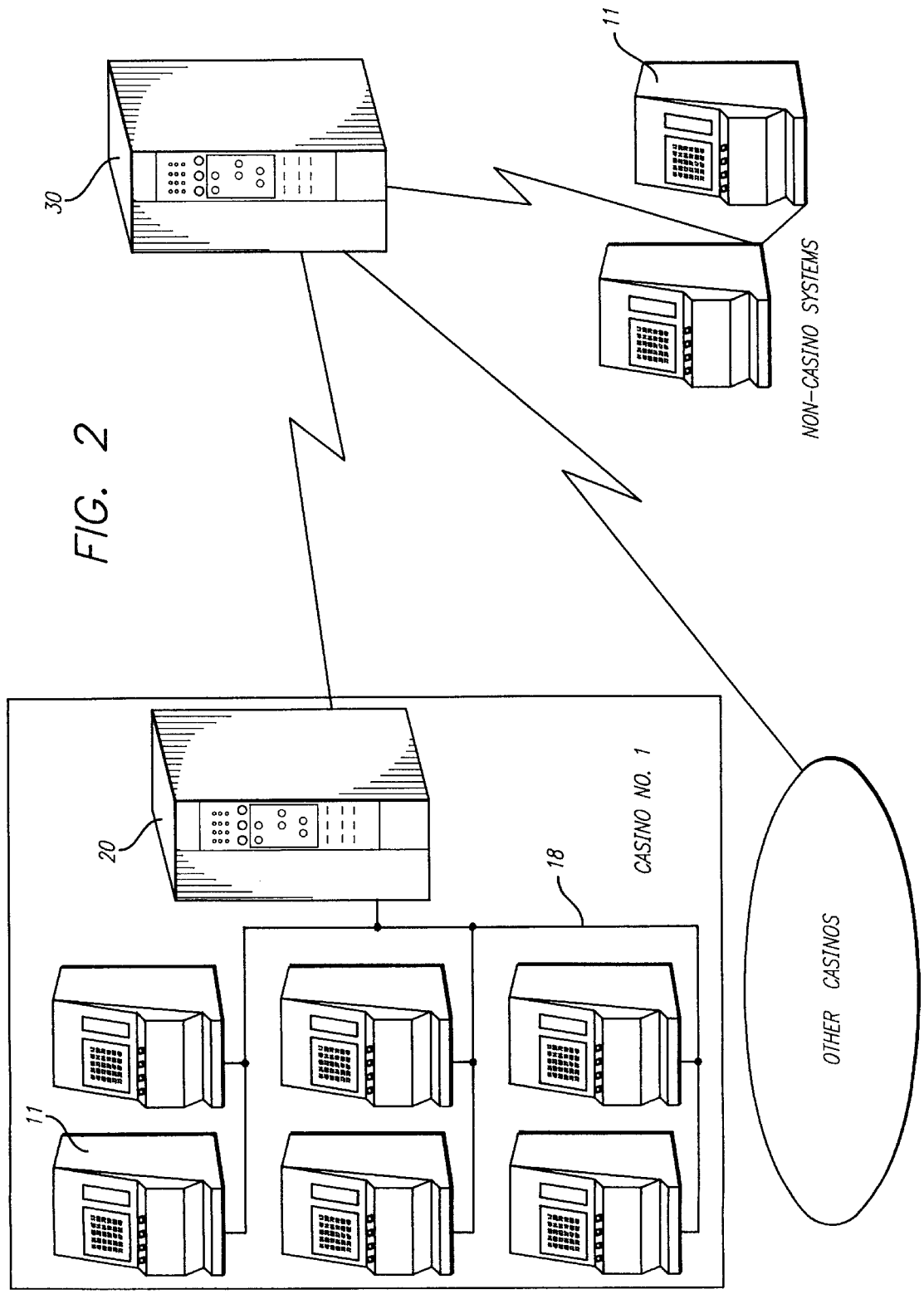
FIG. 2 is a functional diagram of the invention which depicts the interaction of multiple Lotto Gaming Apparatus within a casino with a Master Casino Controller and a Master State Controller with other casinos and satellite Lotto Gaming Apparatus.

In a second embodiment of the invention, the Lotto Gaming Apparatus 10 includes a group of CLMs 11 interconnected through a Casino Master Controller (CMC) 20, as depicted in FIG. 2, located within a single gaming facility allowing multiple players to play a lotto game against their respective apparatus as well as the CMC 20, but independent of the other players' CLMs 11. In this embodiment, the lotto game is played the same as with the single CLM embodiment except, besides each player playing their respectively selected lotto numbers against the randomly selected win numbers unique to their respective CLM 11, they are simultaneously playing their personally selected numbers against a new set of randomly selected numbers [win numbers 2] from the CMC 20 to which their CLM 11 is connected through the local network connection 18. The CMC 20 is selecting the win numbers 2 at preselected intervals which can be seconds, minutes, or even hours under program control of the casino, or gaming facility. In this embodiment of the invention, each player is simultaneously playing the personally selected numbers against his/her CLM 11 generated WIN NUMBER and a CMC 20 generated WIN NUMBER 2 with nearly instant win/loss status acknowledgment and payoff at the CLM 11 they are playing. As an additional element of this embodiment, more than one casino or gaming facility may be interconnected to a state wide network, or national network, as further shown in FIG. 2 so that a State Master Controller (SMC) 30 is independently randomly selecting another set of winning numbers [win numbers 3] against which each individual CLM 11 is simultaneously playing lotto. The individual player now has three chances to win with a single selection of numbers at his/her CLM 11 with instant acknowledgment and possible payoff for winning combinations.

Figure 3:
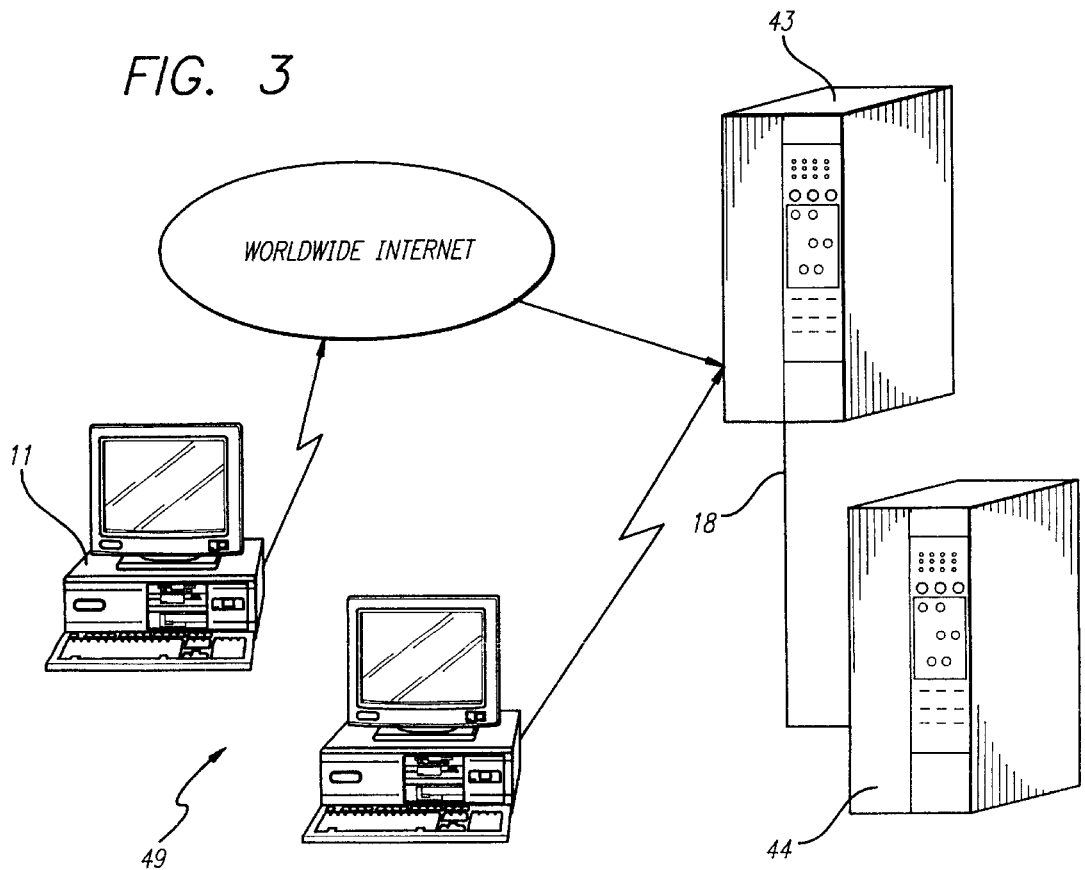
FIG. 3 is a functional diagram of the invention depicting a worldwide lotto game network where home computers interface, via direct dial-up or through Internet, with a worldwide lotto system and lotto accounting system.
Figure 4:
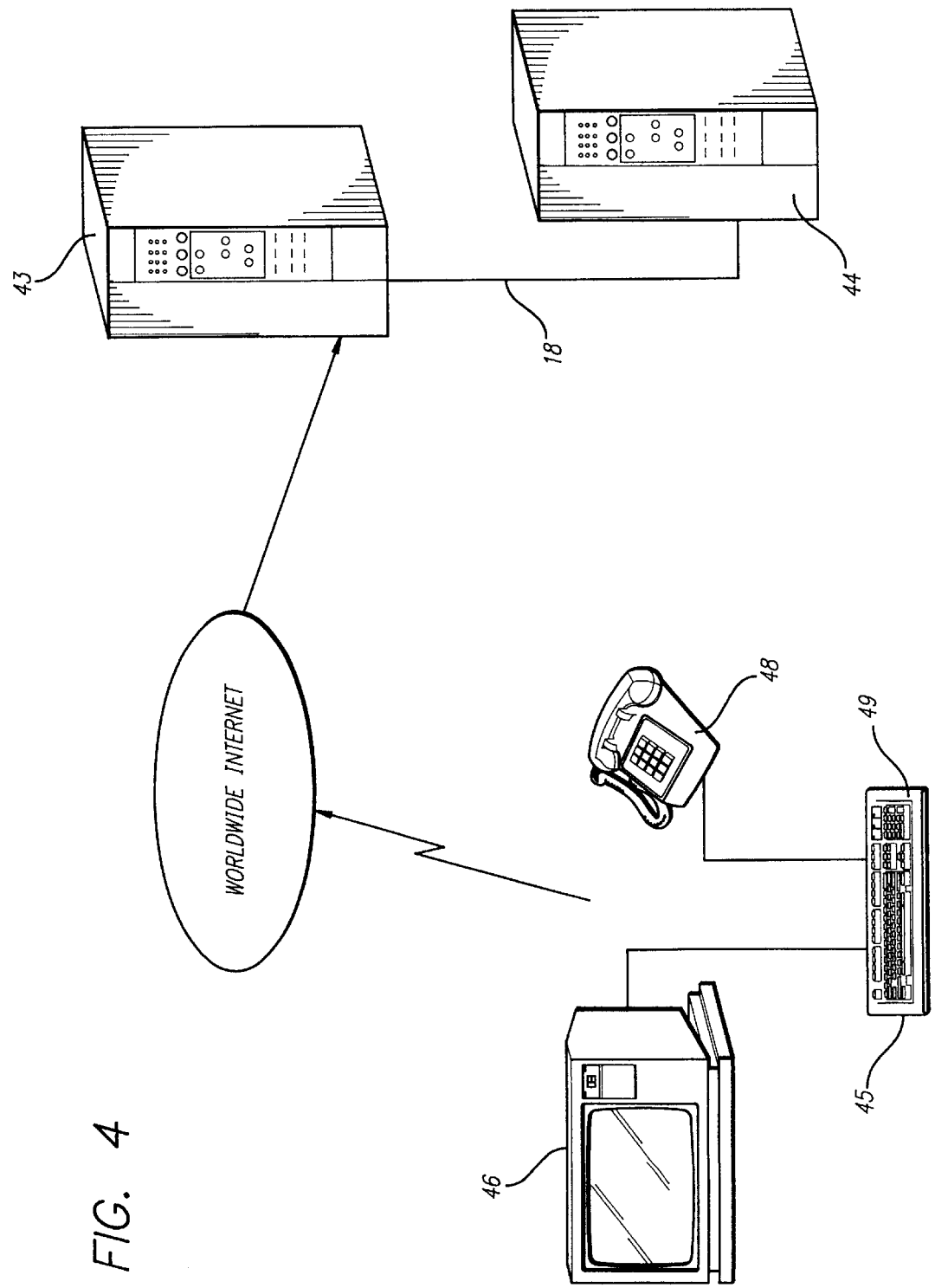
FIG. 4 is a functional diagram of the invention depicting a worldwide Internet lotto game network similar to that shown in FIG. 3, where a home lotto game terminal and TV set replace the home computer.

Another embodiment of the invention, depicted in FIG. 3, involves a plurality of gaming apparatus, namely personal computers with Home Lotto Programs (HLP) 40, interconnected via an electronic telecommunications network such as Internet communication 41, or direct dial-up 42, to a Worldwide Lotto System (WLS) 43 and associated Lotto Accounting System (LAS) 44 to credit and debit personal accounts during the lotto gaming process. In this embodiment, individual players would tie onto the WLS 43 with a personal code and request access to a lotto game. If their credit status is approved by the LAS 44, a lotto game is initiated and played similar to previously describe embodiments, with the exception that in this embodiment the player credit account is charged for the wager automatically and the player selected numbers are played against a single randomly selected set of numbers [WORLDWIDE WIN NUMBERS] generated by the WLS 43. Another configuration of this embodiment, depicted in FIG. 4, would replace the HLP 40 on a personal computer with a dedicated Home Lotto Terminal (HLT) 45 connected to a home TV set 46, much like a home video game except that this HLT 45 would be connected via Internet 41 and a standard telephone line to the WLS 43 and LAS 44. Those trained in chance gaming odds, particularly in the lotto gaming odds discipline, will realize the enormity of a worldwide lotto game and the multimillion dollar payoffs that can be quickly generated by such a network.

Figure 5A:
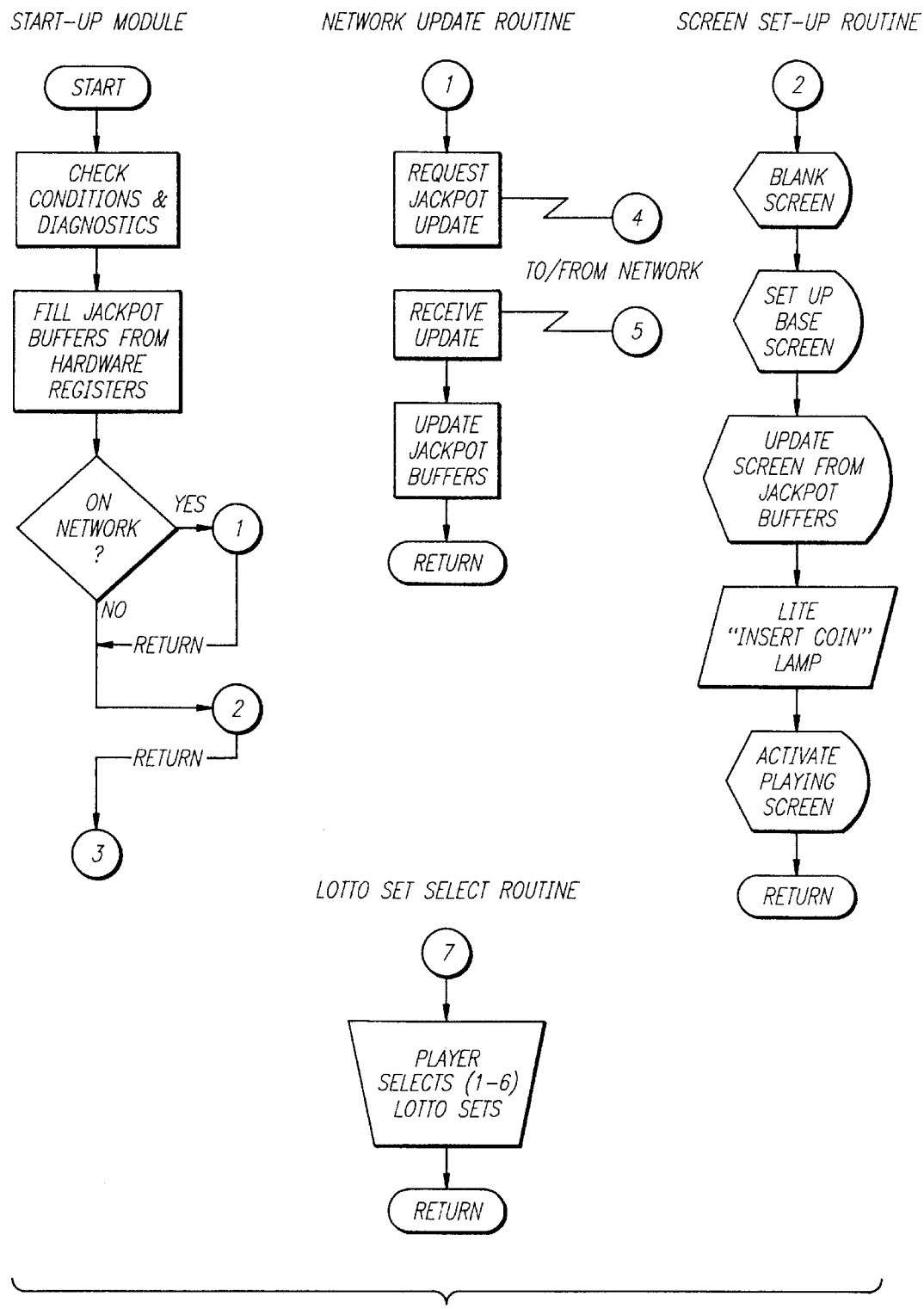

Turning now to FIGS. 5a and 5b, the CLM 11 software modules and sub-routines are flow charted to depict the sequential events that occur when a player initiates a lotto game on the Lotto Gaming Apparatus in a gaming facility.

A player begins a Lotto Gaming Apparatus 10 sequence by inserting coin(s) or choosing to play credit(s) at a CLM 11. This initiates the following sequence of events:

1. CLM 11 responds by enabling the player to select a "Quick Pick" or manually select the desired set(s) of lotto numbers.
2. The player selects from one to six lotto number playing sets via Quick-Pick or manual number selection and starts a game by pushing the "PLAY" key on the CLM 11.
3. CLM 11 spins numbers on player's video display screen. (Note: This is to show activity on the screen for the player. It is actually a simulation of a random generation process to allow time for the determination of win/loss status at each level of the game).
4. CLM 11 selects machine winning numbers through use of a random number generator.
5. CLM 11 passes players number set selections to CMC 20 via an electronic network.
6. CMC 20 validates each players numbers against the previously selected casino winning numbers. (Note: this can be re-selected on a regular or random basis, changing winning numbers as often as one to three seconds.) Winning numbers are selected through random number generator. CMC 20 increments jackpot for each losing play. If a winner is found, CMC 20 re-sets jackpot to seed level.
7. CMC 20 passes players selections to SMC 30 (City, multiple-casino,state etc.) via electronic network.
8. SMC 30 validates each players numbers against the previously selected state winning numbers. (Note this can be re-selected on a regular or random basis, changing winning numbers as often as one to three seconds.) Winning numbers are selected through random number generator.
9. SMC 30 increments jackpot for each losing play. If a winner is found, SMC 30 re-sets jackpot to seed level. SMC 30 passes win/lost statistics and current jackpot to CMC 20.
10. CMC 20 passes win/lost statistics and current jackpot of Casino and SMC 30 to CLM 11.
11. CLM 11 stops spinning, indicates won/lost on video display screen for local CLM 11, Casino Lotto and State Lotto.
12. CLM 11 posts current Casino and State Lotto jackpots.
13. CLM 11 re-sets and waits for Player to play again.

Figure 6:
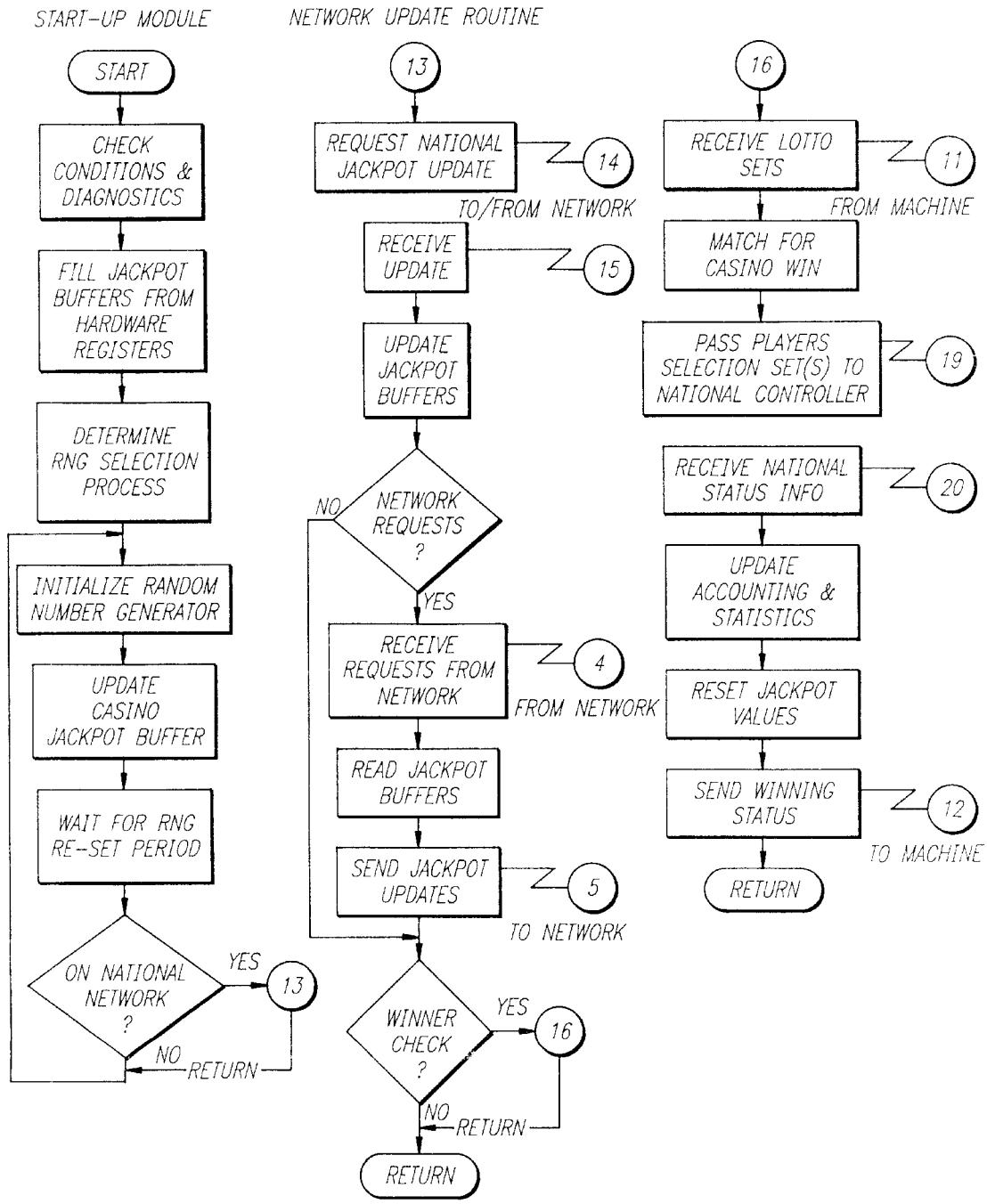
FIG. 6 is a flow diagram depicting the steps that the state controller hardware sequentially performs when a player initiates a lotto game on the Lotto Gaming Apparatus.
Figure 7:
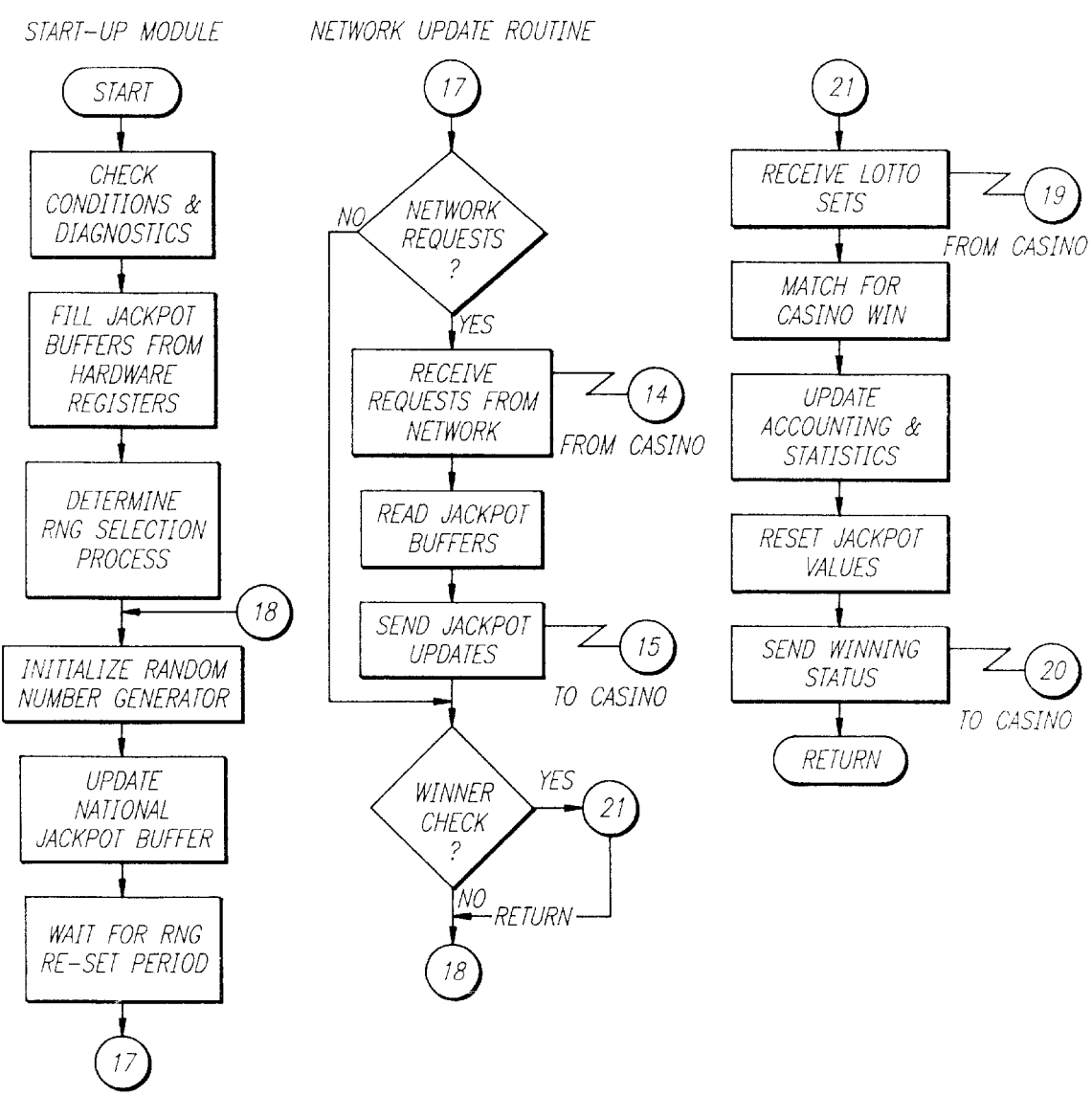
FIG. 7 is a flow diagram depicting the steps that the national controller hardware sequentially performs when a player initiates a lotto game on the Lotto Gaming Apparatus.

Referring now to FIGS. 6 and 7, the flow diagrams depict the sequential events that occur when a player initiates a lotto game on the Lotto Gaming Apparatus from a home environment via an electronic telecommunications network such as the Internet.

A player initiates a lotto playing sequence by starting the Home Lotto Program (HLP) on a personal computer, or on a Home Lotto Terminal (HLT). The HLP or HLT, (hereafter referred to as the Local Program, LP), executes the appropriate program to initiate the following sequence:

1. The LP prompts the player for his(her) Player Identification (eg.: Name) and his(her) PIN (Player Identification Number, a password). If it matches the one stored in the computer (for security, adult supervision, etc.) the LP initiates contact to the Worldwide Lotto System (WLS) either via direct dial, via computer modem or via Internet electronic network.
2. The WLS acknowledges the request for play to the LP and validates serial number and password security with the LP.
3. The LP passes the player's information (PI & PIN) to the WLS.
4. The WLS passes the player's information to the Lotto Accounting System (LAS) for verification of current account status.
5. The LAS provides current account status to the WLS. If sufficient credit exists to play, the LP provides positive indication on the video display screen for player, and Internet Lotto play may begin. Otherwise, the player is informed of lack of credit and advised to arrange for additional credit. If such a rejection occurs, the LP disconnects from the WLS and resets for further player initiation.
6. The WLS downloads the current account status and current jackpot status to the LP.
7. Assuming the player has sufficient credit to play, the player may begin play by either manually selecting a set(s) of lotto numbers or by pushing "Quick-Pick." If "Quick-Pick" is selected, the LP, using a random number generator, selects from one to six sets of lotto numbers.

8. The player then pushes "PLAY", (on the HLT) or enters "PLAY", (on the computer), and the playing of Internet Lotto begins.

9. The LP creates a "spin" on the video display screen to simulate a lotto draw in progress to allow time for the determination of win/loss status. The LP passes the selected lotto number sets to the WLS.

10. The WLS accepts the lotto number sets from the LP and determines win/lose conditions. If a win is realized, the jackpot is zeroed to start, the player's accounting balance is incremented by the amount won and the game status along with the current jackpot is passed to the LP.

11. The LP posts the game status and the current jackpot to the video display screen and completes the game cycle.

12. Based on his current account status, the player can either continue to play or retire from the game.

13. If the player desires to retire from the game, the LP advises the WLS with a request to disconnect. If the WLS approves, the WLS updates the LAS with current account status from the recent game play and advises the LP to disconnect.

14. The LP then disconnects from the WLS and returns to an inactive state or to the DOS/Windows Prompt if via a personal computer.

In any of the embodiments herein described, methods can be incorporated to provide instant status of increasing (progressive) payouts at each level of the lotto game, whether local, gaming facility, state, national or worldwide level. By incorporating a seed level (i.e.; the minimum level of the progressive jackpot after payout of a jackpot—a pick-six-of-six win) an attractive win payout is always available to the player. Also methods provide a variable win/loss ration capability so that the actual and relative win verses loss amounts can be adjusted. Two ways of adjusting the win/loss rations can be by either changing the jackpot seed level or by adjusting the quantity of lotto numbers to be played (e.g.: 51, 60, 70, etc.).

From the above, it can be seen that the present invention represents a method and apparatus for implantation of a lotto game which can have highly attractive playing qualities, relatively low equipment cost and provide virtually instantaneous win/loss results for a variety of normal and progressive games on both a local and distributed basis.

While various preferred embodiments of the invention have been illustrated, it will be seen by those skilled in the art that various modifications and changes may be made thereto without departing from the spirit of the invention as defined in the appended claims.

I claim:

1. A lotto gaming apparatus for the play of a lotto game, comprising:

a lotto machine with display and input/output capability, wherein said lotto machine contains a central processing unit (CPU), a random number generator and a memory device;

means for allowing a player to select a series of numbers to be played on said lotto machine;

first controller means disposed in said lotto machine for said lotto machine to generate first win numbers for each play initiated by said player;

second controller means located within a gaming facility and connected to said lotto machine for generating second win numbers for each play initiated by said player;

local means disposed in said lotto machine for comparing said first and second win numbers generated by said first controller of said lotto machine and said second controller with numbers selected by said player on said lotto machine;

means for a player to receive payouts from said lotto machine based upon said comparison of numbers; and means for displaying a status of progressive payouts for said first and second win numbers of the lotto game.

2. The lotto gaming apparatus of claim 1, wherein said input/output capability is provided by a keyboard.

3. The lotto gaming apparatus of claim 2, wherein said keyboard includes a numeric key pad.

4. The lotto gaming machine of claim 2, wherein said keyboard further includes a plurality of function keys for commanding operational functions of said lotto gaming apparatus.

5. The lotto gaming apparatus of claim 1, wherein said means for placing wagers into said lotto machine is provided by receiving areas on said lotto machine for accepting paper money, coins, and/or credit cards.

6. The lotto gaming apparatus of claim 1, wherein said input/output capability is provided by voice communications.

7. The lotto gaming apparatus of claim 1, wherein said input/output capability is provided by capacitive contact selection of menu items on said display.

8. A lotto gaming apparatus for the play of a lotto game, comprising:

a plurality of lotto machines each with display and input/output capability, wherein said lotto machines each contain a central processing unit, a random number generator and a memory device;

means for allowing players at each said lotto machine to select a series of numbers to be played on said lotto machine;

first controller means disposed in each of said lotto machines for said lotto machines to generate first win numbers for each play initiated by said players;

second controller means located in a gaming facility and connected to said lotto machine for generating second win number for each play initiated by said player;

third controller means connected to said gaming facility and said lotto machine for generating third win numbers for each play initiated by said player;

local means disposed in said lotto machines for comparing said first, second and third win numbers generated by said first controller means of said lotto machines, said second controller means and said third controller means with numbers selected by said players on said lotto machines;

means for players to receive payouts from said lotto machines based upon said comparison of numbers at each lotto machine; and means for displaying a status of progressive payouts for said first, second and third win numbers of the lotto game.

9. The lotto gaming apparatus of claim 8, wherein said input/output capability for each said lotto machine is provided by a keyboard.

10. The lotto gaming apparatus of claim 9, wherein said keyboard includes a numeric key pad.

11. The lotto gaming apparatus of claim 9, wherein said keyboard further includes a plurality of function keys for commanding operational functions of said lotto gaming apparatus.

12. The lotto gaming apparatus of claim 8, wherein said means for placing wages into said lotto machines is provided by integral slots on said lotto machines for accepting paper money, coins, and/or credit cards.

13. The lotto gaming apparatus of claim 8, wherein said input/output capability is provided by voice communications.

14. The lotto gaming apparatus of claim 8, wherein said input/output capability is provided by capacitive contact selection of menu items on said display.

* * * * *

UNITED STATES PATENT AND TRADEMARK OFFICE
CERTIFICATE OF CORRECTION

PATENT NO. : 6,080,062
DATED : June 27, 2000
INVENTOR(S) : Carl M. Olson

Page 1 of 1

It is certified that error appears in the above-identified patent and that said Letters Patent is hereby corrected as shown below:

<u>Title page,</u>
Under "U.S. PATENT DOCUMENTS", change fifth listed patent "4,704,693", to read -- 4,704,696 --.
Under "U.S. PATENT DOCUMENTS", add the following patent: -- 5,354,069 11/1994 Guttman et al. 237/439 --.

Signed and Sealed this

Eleventh Day of September, 2001

*Attest:*

*Attesting Officer*

NICHOLAS P. GODICI
*Acting Director of the United States Patent and Trademark Office*